United States Patent [19]
Brown

[11] Patent Number: 6,135,380
[45] Date of Patent: Oct. 24, 2000

[54] SEAT BELT WEBBING PRETENSIONER

[75] Inventor: Louis R. Brown, Oxford, Mich.

[73] Assignee: TRW Vehicle Safety Systems Inc., Lyndhurst, Ohio

[21] Appl. No.: 09/287,853

[22] Filed: Apr. 7, 1999

[51] Int. Cl.[7] .................................................. B60R 22/46
[52] U.S. Cl. ........................................... 242/374; 280/806
[58] Field of Search ........................... 242/374; 280/806; 297/478, 480, 483

[56] References Cited

U.S. PATENT DOCUMENTS

| | | | |
|---|---|---|---|
| 4,191,344 | 3/1980 | Tillac | 242/374 |
| 4,232,886 | 11/1980 | Tsuge et al. | 280/806 |
| 4,667,904 | 5/1987 | Herndon | 280/806 |
| 5,326,043 | 7/1994 | Yamanoi | 242/374 |
| 5,485,970 | 1/1996 | Steffens, Jr. . | |
| 5,553,803 | 9/1996 | Mitzkus et al. . | |
| 5,676,397 | 10/1997 | Bauer | 280/806 |
| 5,829,841 | 11/1998 | Pywell et al. . | |

*Primary Examiner*—John M. Jillions
*Attorney, Agent, or Firm*—Tarolli, Sundheim, Covell, Tummino & Szabo L.L.P.

[57] ABSTRACT

An apparatus comprises seat belt webbing (12) for restraining movement of a vehicle occupant. The apparatus also comprises a pretensioner (10) for pretensioning the belt webbing (12). The belt webbing (12) has a portion (84) extending through the pretensioner (10). The pretensioner (10) includes an air bag (52) having a deflated condition and an inflated condition. The air bag (52) when in the inflated condition acts on the belt webbing portion (84) to draw belt webbing into the pretensioner (10) to tension the seat belt webbing, and causes the belt webbing portion to be blocked from being pulled out of the pretensioner. The pretensioner (10) includes an inflation fluid source (54) actuatable to supply inflation fluid to inflate the air bag (52) into the inflated condition.

11 Claims, 6 Drawing Sheets

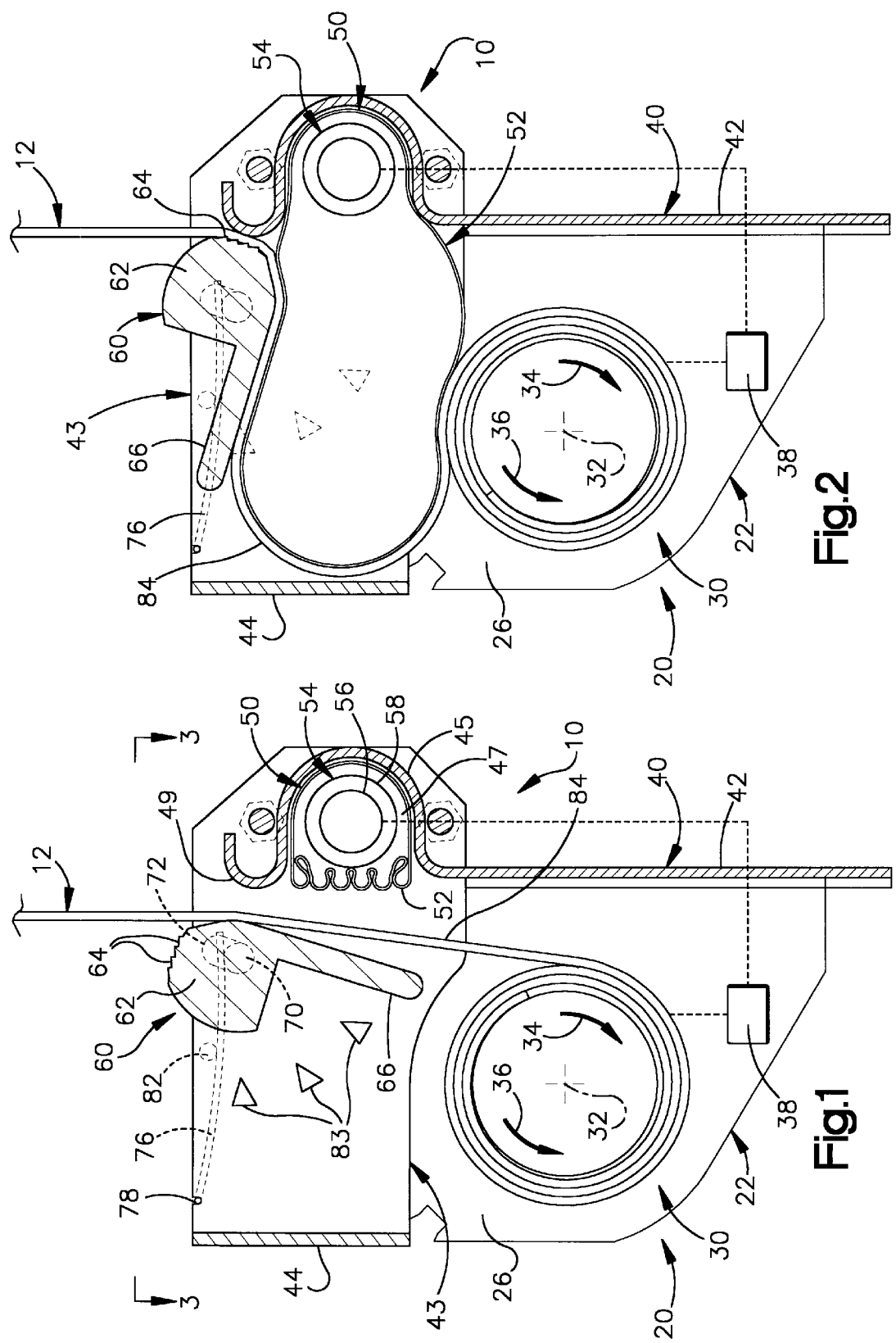

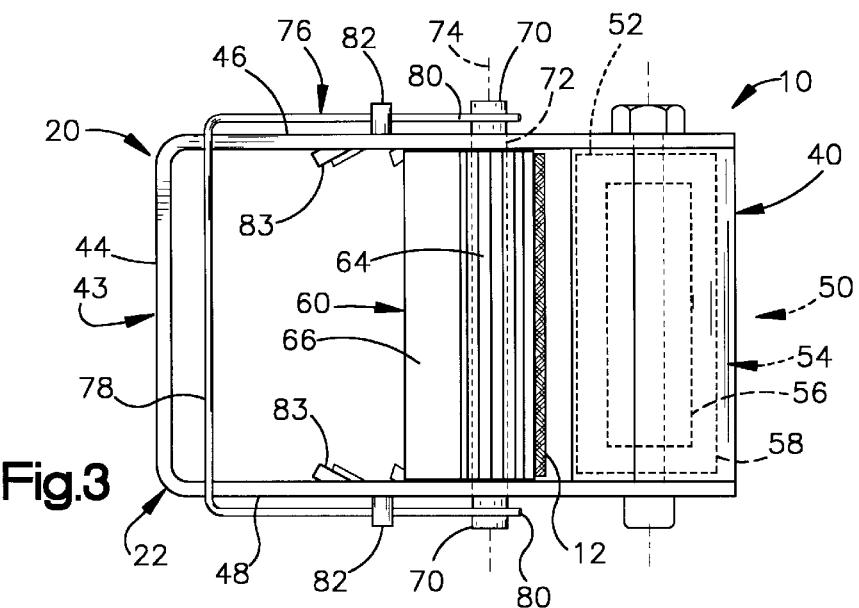
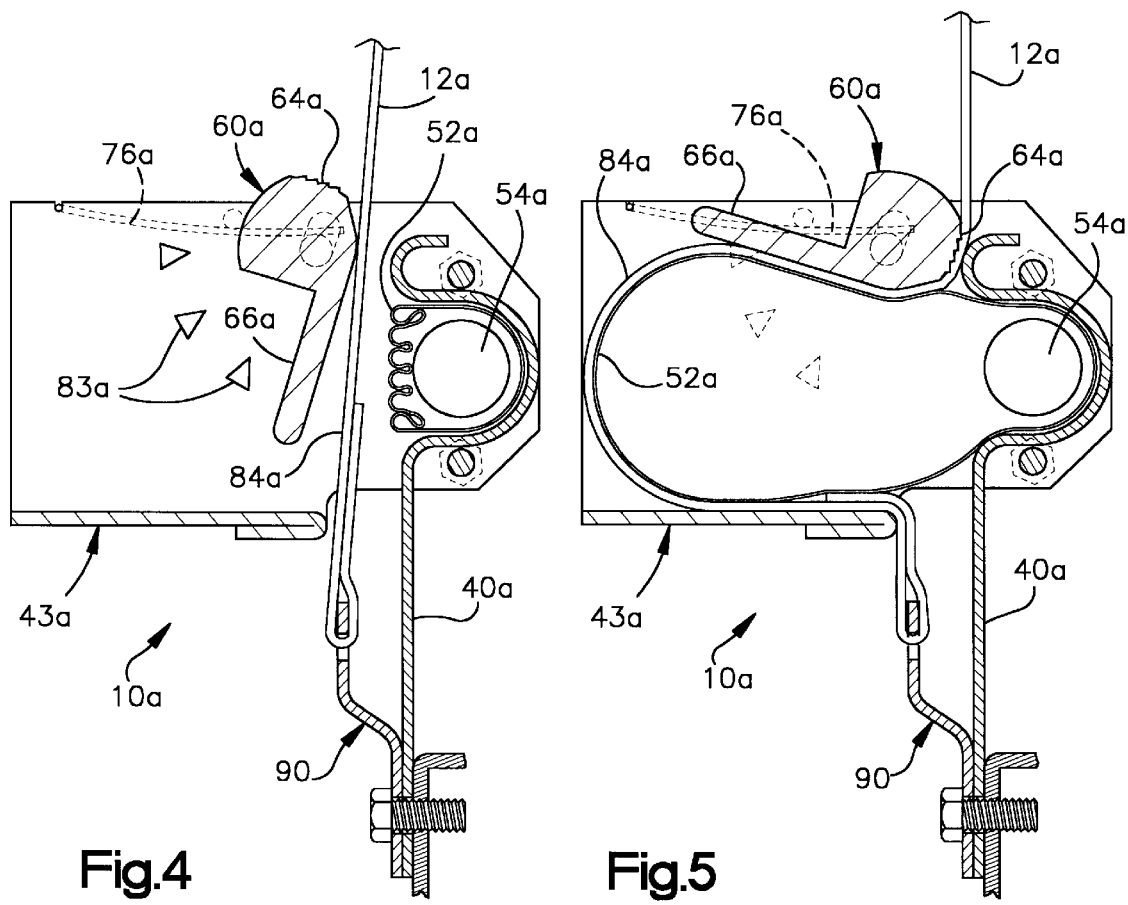
Fig.3
Fig.4
Fig.5

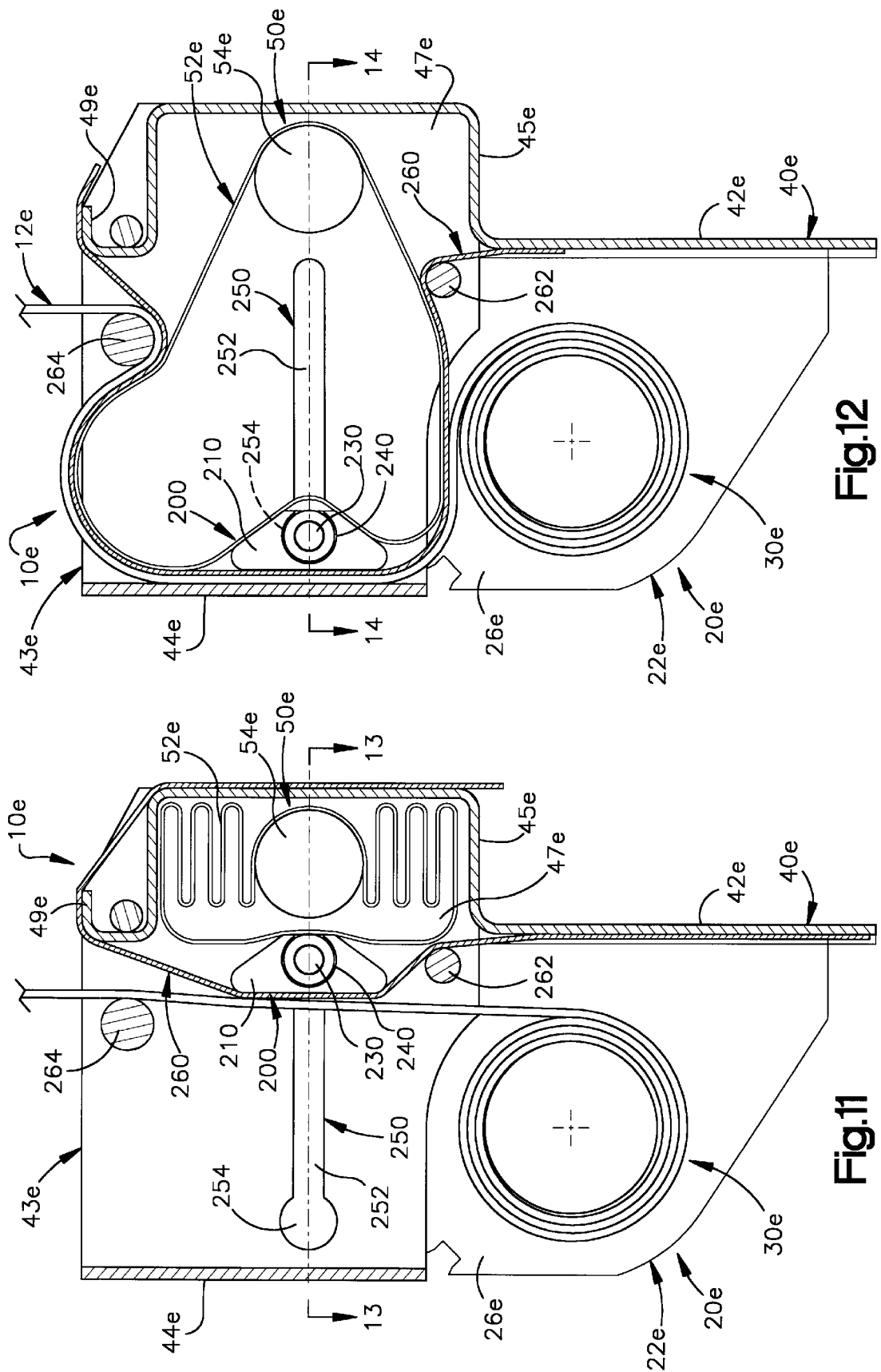

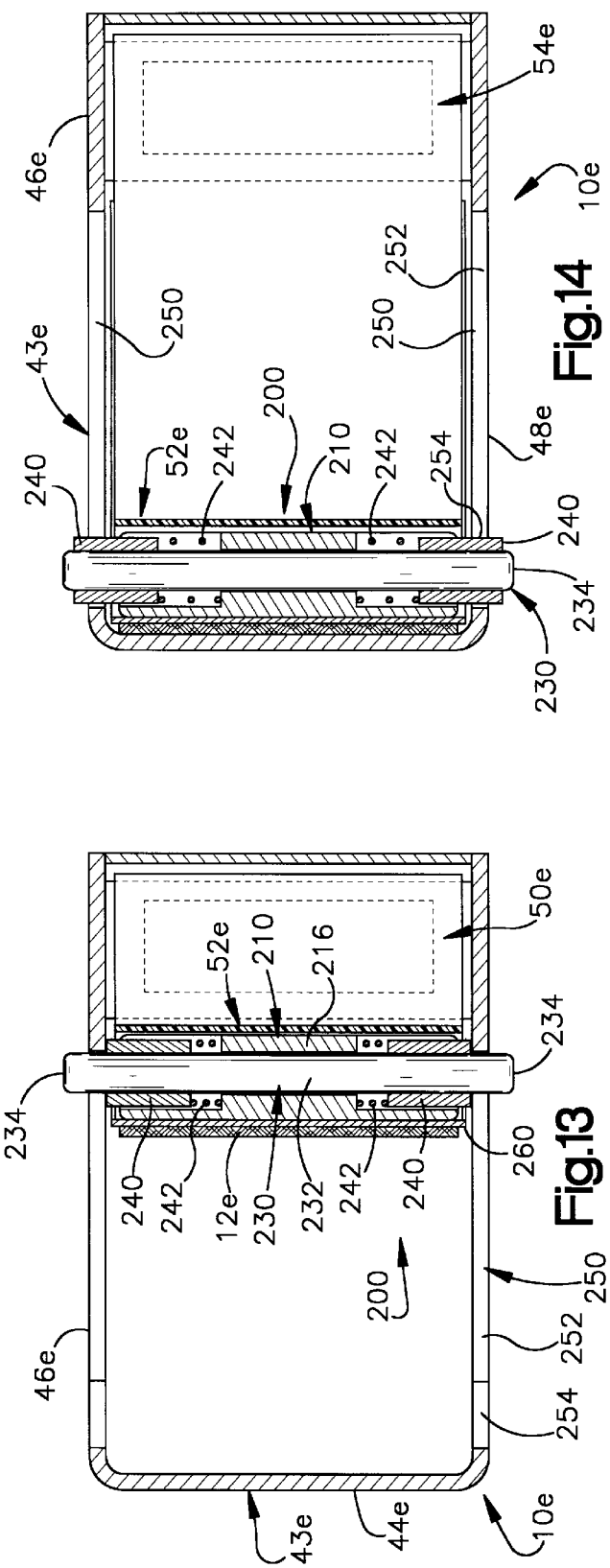
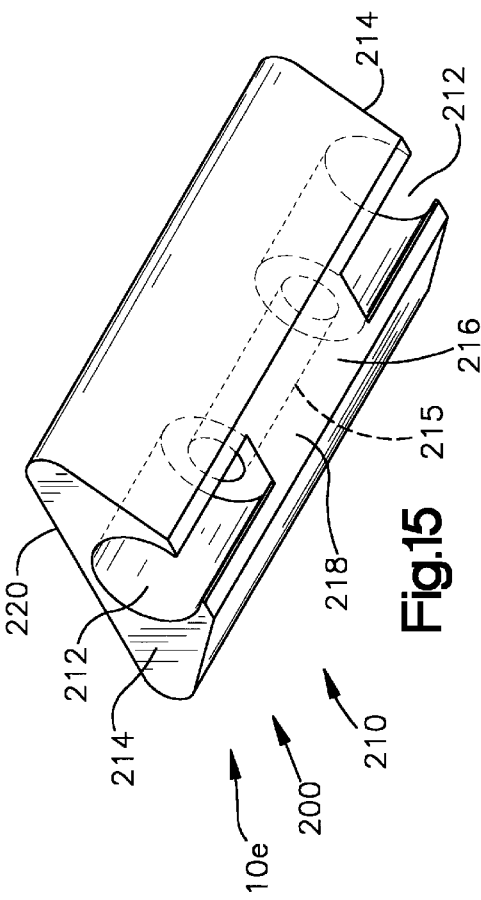

SEAT BELT WEBBING PRETENSIONER

BACKGROUND OF THE INVENTION

1. Technical Field

The present invention relates to a vehicle seat belt webbing pretensioner.

2. Description of the Prior Art

A typical vehicle seat belt system includes a length of belt webbing wound on a spool of a seat belt webbing retractor. The belt webbing is extensible about a vehicle occupant to restrain the occupant. The belt webbing spool rotates in a belt withdrawal direction as the occupant withdraws belt webbing from the retractor. A rewind spring is connected with the belt webbing spool and biases the belt webbing spool for rotation in an opposite belt retraction direction.

The seat belt webbing may sometimes become slack around the vehicle occupant. It is known to use a pretensioner to remove slack from the seat belt webbing in the event of a vehicle collision. The slack can be removed in different ways for example, by rotating the spool of the retractor in the belt retraction direction, by pulling on a buckle of the seat belt system, or by applying force to the belt webbing adjacent an anchor of the seat belt system.

It is known to use a pyrotechnic device, such as a gas generator, to provide fluid under pressure for tensioning the belt webbing. The fluid is used to rotate the spool in the belt retraction direction to tension the belt webbing, or to move a piston to pull on the belt webbing.

SUMMARY OF THE INVENTION

The present invention is an apparatus comprising seat belt webbing for restraining movement of a vehicle occupant. The apparatus also comprises a pretensioner for pretensioning the belt webbing. The belt webbing has a portion extending through the pretensioner. The pretensioner includes an air bag having a deflated condition and an inflated condition. The air bag when in the inflated condition acts on the portion of the belt webbing to draw belt webbing into the pretensioner to tension the seat belt webbing, and causes the portion of the belt webbing to be blocked from being pulled out of the pretensioner. The pretensioner includes an inflation fluid source actuatable to supply inflation fluid to inflate the air bag into the inflated condition.

BRIEF DESCRIPTION OF THE DRAWING

Further features of the present invention will become apparent to one skilled in the art to which the present invention relates from reading the following specification with reference to the accompanying drawings, in which:

FIG. 1 is a side view partially in section of a retractor including a pretensioner constructed in accordance with the present invention;

FIG. 2 is a view similar to FIG. 1, showing the pretensioner in an actuated condition;

FIG. 3 is a top plan view of the retractor and pretensioner of FIG. 1;

FIG. 4 is a view similar to FIG. 1 of a pretensioner in accordance with a second embodiment of the present invention, associated with a seat belt webbing anchor;

FIG. 5 is a view similar to FIG. 4, showing the pretensioner in an actuated condition;

FIG. 11 is a view similar to FIG. 1 of a pretensioner in accordance with a sixth embodiment of the present invention, including parts enabling use of the pretensioner with a force limiter;

FIG. 12 is a view similar to FIG. 11 showing the pretensioner in an actuated condition;

FIG. 13 is a sectional view taken generally along line 13—13 of FIG. 11;

FIG. 14 is a sectional view taken generally along line 14—14 of FIG. 12; and

FIG. 15 is a perspective view of a yoke which forms part of the pretensioner of FIG. 11.

DESCRIPTION OF PREFERRED EMBODIMENTS OF THE INVENTION

Figures 6, 7:
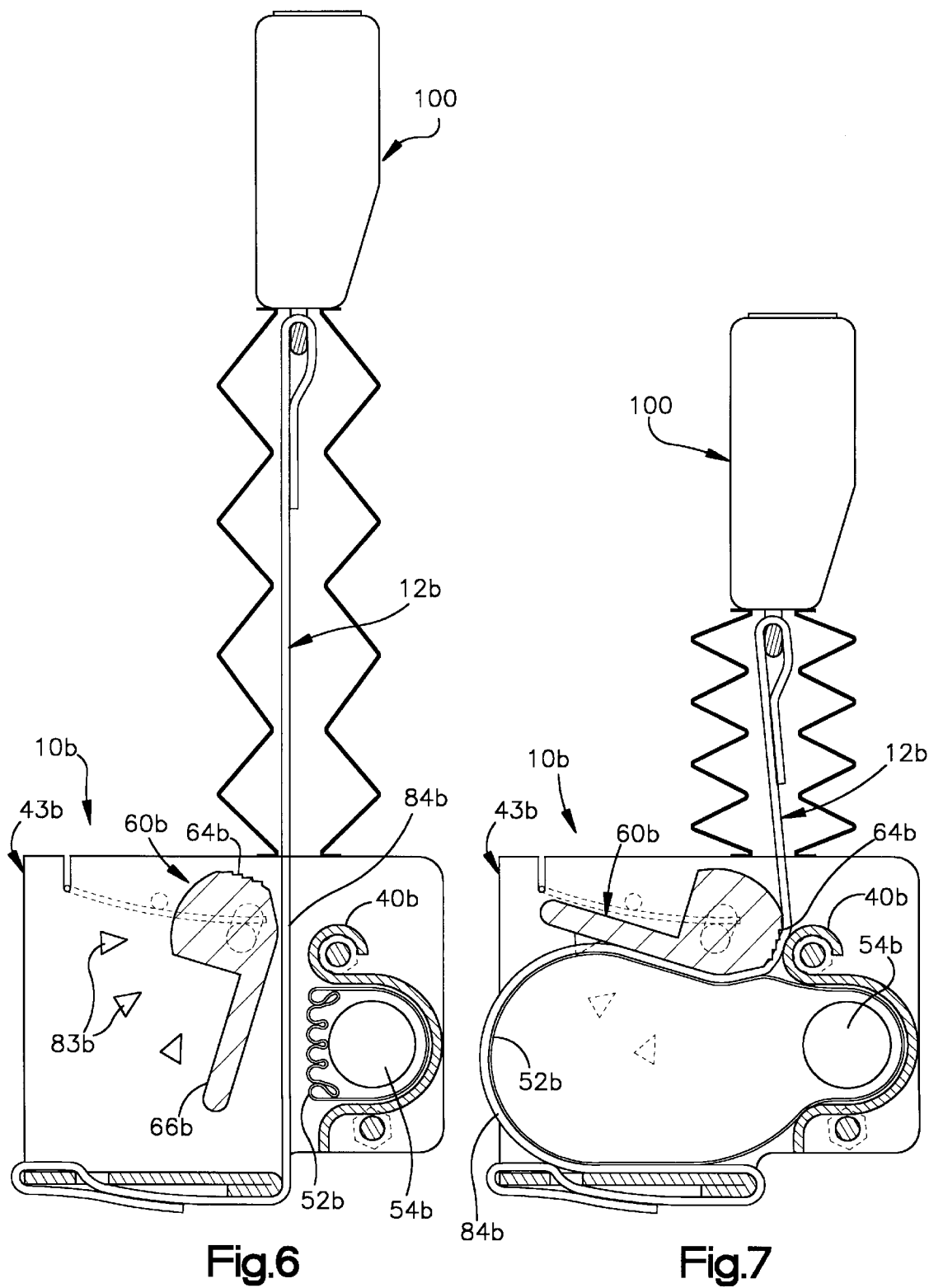
FIG. 6 is a view similar to FIG. 1 of a pretensioner in accordance with a third embodiment of the present invention, associated with a seat belt webbing buckle.
FIG. 7 is a view similar to FIG. 6, showing the pretensioner in an actuated condition.

The present invention relates to a vehicle seat belt webbing pretensioner. As representative of the present invention, FIGS. 1–3 illustrate a seat belt webbing pretensioner 10. The pretensioner 10 is incorporated in a three-point continuous loop seat belt system (not shown) for use in restraining an occupant of a vehicle. In this seat belt system, a length of seat belt webbing, a portion of which is shown at 12, is extensible about a vehicle occupant. One end of the length of belt webbing 12 is anchored to the vehicle body at an anchor point. The opposite end of the belt webbing 12 is attached to a retractor 20 which is secured to the vehicle body. A portion of the belt webbing 12 is wound on a spool 30 of the retractor 20. When the belt webbing 12 has been pulled across the lap and torso of the vehicle occupant, the length of belt webbing is divided into a torso portion which extends across the torso of the occupant and a lap portion which extends across the lap of the occupant.

The retractor 20 includes a frame 22 which is fixed to the vehicle body in a manner not shown. The frame 22 is made from sheet metal stamped and formed to a U-shaped configuration. The frame 22 includes a back wall 24 and spaced, parallel side walls 26 and 28 which extend generally perpendicular to the back wall. The frame 22 supports the belt webbing spool 30 for rotation about a belt webbing spool axis 32 in a belt retraction direction 34 (FIG. 1) and in an opposite belt withdrawal direction 36. A rewind spring assembly (not shown) biases the belt webbing spool 30 for rotation in the belt retraction direction 34.

The retractor 20 also includes known means indicated schematically at 38 for blocking rotation of the belt webbing spool 30 in the belt withdrawal direction 36 upon sensing a vehicle condition for which tensioning of the seat belt webbing is desired. Such a vehicle condition may be, for example, sudden vehicle deceleration above a predetermined deceleration, or withdrawal of belt webbing 12 from the belt webbing spool 30 at a rate exceeding a predetermined rate, such as can occur in a vehicle collision. Such a vehicle condition can also be a side impact to the vehicle or a rollover condition of the vehicle.

The means 38 includes a sensor for sensing the occurrence of such a vehicle condition, and an associated spool locking mechanism such as spool locking ratchet wheels and a lock bar. The sensor may be a mechanical sensor which uses a member movable upon sudden vehicle deceleration or a side impact or a rollover condition to actuate an electric circuit. The sensor may also be an electronic sensor, for example, a piezoelectric transducer or pressure sensor. The sensor may also comprise a controller which determines the existence of such a vehicle condition on the basis of parameters including vehicle speed, engine speed, road wheel speed, occupant position, etc.

The means 38 may also include a spring-loaded actuator for actuating the inflation fluid source. The retractor 20 may also include, in addition to the means 38, a cinch mechanism (not shown) for selectively moving the lock bar into engagement with the spool locking ratchet wheels.

The pretensioner 10 includes a separate pretensioner frame 43 mounted on the retractor frame 22. The pretensioner frame 43 has a U-shaped configuration as best seen in FIG. 3 and includes a back wall 44 and opposite side walls 46 and 48.

The pretensioner 10 includes a base 40. The base 40 is a single piece of metal which extends between the side walls 46 and 48 of the pretensioner frame 43 at a location opposite the back wall 44 of the pretensioner frame. The base 40 has a planar mounting portion 42 for mounting the assembly of the retractor 20 and the pretensioner 10 to the vehicle.

An arcuate central portion 45 of the base 40 extends from the mounting portion 42. The central portion 45 of the base 40 defines a generally cylindrical air bag assembly chamber 47 which is presented toward the back wall 44 of the pretensioner frame 43. An arcuate clamping portion 49 of the base 40 extends from the central portion 45. The convex outer surface of the clamping portion 49 of the base 40 is presented toward the back wall 44 of the pretensioner frame 43.

The pretensioner 10 includes an air bag assembly 50. The air bag assembly 50 includes an air bag 52 and an inflator assembly indicated schematically at 54. The inflator assembly 54 includes an inflator 56 in a diffuser 58. The inflator 56 preferably contains a stored quantity of pressurized inflation fluid for inflating the air bag. The inflator assembly 54 alternatively could include an inflator 56 which uses the combustion of gas-generating material to generate inflation fluid in the form of gas to inflate the air bag 52. As another alternative, the inflator assembly 54 could include an inflator which contains both a stored quantity of pressurized inflation fluid and an ignitable material for heating the inflation fluid.

The air bag 52 is an inflatable device defining a closed inflation fluid volume for receiving inflation fluid from the inflator 56. The air bag 52 unrolls or unfolds as it inflates from a deflated condition to an inflated condition. The air bag 52 can be made from a fabric material such as woven nylon or, alternatively, from a non-woven material, such as plastic film. The air bag 52 is preferably sewn into its final configuration with the inflator assembly 54 inside. An opening in the air bag 52 allows an end portion of the inflator assembly 54 to project from the air bag. Lead wires extend from the inflator assembly 54 for receiving, from the means 38, an electric actuating current for the inflator assembly.

The air bag assembly 50 is mounted in the chamber 47 in the central portion 45 of the pretensioner base. The air bag assembly 50 is oriented so that the air bag 52, when inflated, extends from the open side of the arcuate central portion 45 of the pretensioner base 40, away from the inflator assembly 54, in a direction toward the back wall 44 of the pretensioner frame 43.

The pretensioner 10 includes a webbing clamp 60 supported on the frame 43. The webbing clamp 60 extends between the side walls 46 and 48 of the pretensioner frame 43. The webbing clamp 60 has a main body portion 62 on which are formed a series of gripping teeth 64. A detent arm 66 of the webbing clamp extends from the main body portion 62.

A pair of pins 70 on the main body portion 62 of the webbing clamp 60 are received in slots 72 in the frame side walls 46 and 48. The pins 70 are both slidable and rotatable in the slots 72. The pins 70 support the webbing clamp 60 on the pretensioner frame 43 for pivotal movement relative to the frame between an unactuated condition shown in FIG. 1 and a clamping condition shown in FIG. 2. The slots 72 enable a small amount of sliding movement of the webbing clamp 60, relative to the pretensioner frame 43, under load applied to the belt webbing 12.

The pretensioner 10 includes a U-shaped wire spring 76 supported on the side walls 46 and 48 of the pretensioner frame 43. The spring 76 has a central portion 78 and a pair of end portions 80 in engagement with the pins 70. Leg portions of the wire spring 76, extending between the central portion 78 and the end portions 80, engage embossed studs 82 on the frame side walls 46 and 48. The studs 82 are located so that they bend the leg portions of the wire spring 76 and thereby preload the end portions 80 of the wire spring. The force applied by the end portions of the preloaded wire spring 76 acts on the pins 70 to hold the webbing clamp 60 in a first position of sliding movement relative to the slots 72.

A series of detents 83 are formed on the side walls 46 and 48 of the pretensioner frame 43. The detents 83 are engageable by the detent arm 66 of the webbing clamp 60 upon movement of the webbing clamp from the unactuated condition shown in FIG. 1 to a clamping condition shown in FIG. 2.

In normal driving conditions, the pretensioner 10 is in an unactuated condition as shown in FIG. 1 in which the inflator assembly 54 is not actuated and the air bag 52 is uninflated. The webbing clamp 60 is in its unactuated condition, in which the detent arm 66 extends generally parallel to an intermediate portion 84 of the belt webbing 12 which is located within the frame 22. The belt webbing portion 84 extends from the retractor spool 30 in a generally linear orientation between the air bag 52 and the webbing clamp 60. The belt webbing portion 84 is movable freely through the space between the air bag 52 and the webbing clamp 60, with no significant resistance from the webbing clamp.

Upon sensing a vehicle condition for which tensioning of the seat belt webbing is desired, the means 38 sends an electric signal to the inflator 56, which rapidly emits inflation fluid under pressure. The air bag 52 is inflated and moves to the inflated condition shown in FIG. 2. Simultaneously, the means 38 causes the retractor spool locking mechanism to block rotation of the belt webbing spool 30 in the belt withdrawal direction 36.

As the air bag 52 inflates, it contacts the belt webbing portion 84 disposed within the pretensioner frame 43. The inflating air bag 52 pushes the belt webbing 84 in a direction toward the back wall 44 of the pretensioner frame 43, that is, to the left as viewed in FIGS. 1 and 2. The belt webbing 84 is moved out of its linear orientation and assumes a curved orientation extending around the inflated air bag 52.

This curved orientation or path of the belt webbing portion 84 is substantially longer than the linear orientation or path along which the belt webbing 84 extends when the retractor 20 is in the non-pretensioned ode as shown in FIG. 1. Operation of the pretensioner thus draws additional belt webbing 12 into the pretensioner frame 43 to account for this difference in path lengths. Specifically, because the retractor spool 30 is locked, the additional belt webbing is pulled into the pretensioner frame 43 by the air bag 52 from the other parts of the seat belt system, in a downward direction as viewed in FIGS. 1 and 2.

As the belt webbing 12 changes orientation because of the inflation of the air bag 52, the belt webbing engages the detent arm 66 of the webbing clamp 60. The webbing clamp 60 is pivoted from its unactuated condition shown in FIG. 1 to its actuated condition shown in FIG. 2. The detent arm 66 of the webbing clamp 60 passes over the detents 83 on the side walls 46 and 48 of the pretensioner frame 43.

When the pretensioner 10 is fully actuated, as shown in FIG. 2, the last detent 83 which is passed by the detent arm 66 blocks return movement of the webbing clamp 60 to its unactuated position. At the same time, the gripping teeth 64 on the main body portion 62 of the webbing clamp 60 cooperate with the clamping portion 49 of the pretensioner base 40 to prevent the belt webbing 12 from being pulled out of the retractor 20, in an upward direction as viewed in FIG. 2. The air bag 52 remains inflated for an extended period of time, for example, a period of five to ten seconds.

FIGS. 4 and 5 illustrate a pretensioner 10a constructed in accordance with a second embodiment of the present invention. The pretensioner 10a is actuatable to pretension a length of seat belt webbing 12a which is terminated in a seat belt webbing anchor 90. The pretensioner 10a is similar in construction and operation to the pretensioner 10 (FIGS. 1–3), and parts which are the same or similar are given the same reference numeral with the suffix "a" added.

When the pretensioner 10a is in the unactuated condition shown in FIG. 4, the length of seat belt webbing 84a located adjacent the pretensioner extends from the anchor 90 along a linear orientation between the air bag 52a and webbing clamp 60a. Upon actuation of the pretensioner 10a, the inflating air bag 52a engages the belt webbing portion 84a. The belt webbing 84a is moved out of the linear orientation and assumes a curved orientation extending around the inflated air bag 52a. The additional length of belt webbing 12a which is needed to extend around the inflated air bag 52a in this curved orientation is drawn toward the anchor 90 from the other parts of the seat belt system, in a downward direction as viewed in FIGS. 4 and 5.

As the belt webbing 84a changes its orientation because of the inflation of the air bag 52a, the belt webbing engages the webbing clamp 60a. After the air bag 52a is inflated, the webbing clamp 60a prevents the belt webbing from being pulled away from the anchor 90, in an upward direction as viewed in FIG. 5.

FIGS. 6 and 7 illustrate a pretensioner 10b constructed in accordance with a third embodiment of the present invention. The pretensioner 10b is actuatable to pretension a length of seat belt webbing 12b which connects a seat belt buckle 100 with the pretensioner frame 43b. The pretensioner 10b is generally similar in construction and operation to the pretensioner 10a, and parts which are the same or similar are given the same reference numeral with the suffix "b" added.

When the pretensioner 10b is in the unactuated condition shown in FIG. 6, a portion 84b of the seat belt webbing 12b extends from the buckle 100 along a linear orientation between an air bag 52b and a webbing clamp 60b. Upon actuation of the pretensioner 10b, the inflating air bag 52b engages the belt webbing portion 84b and moves it out of the linear orientation into a curved orientation extending around the inflated air bag. This movement draws additional belt webbing 12b into the pretensioner 10b, causing the buckle 100 to move in a direction to tighten the belt webbing in the seat belt system.

As the belt webbing portion 84b changes its orientation because of the inflation of the air bag 52b, the belt webbing engages and pivots the webbing clamp 60b. The webbing clamp 60b cooperates with the pretensioner base 40b to prevent the buckle 100 from being pulled in a direction to allow slack into the seat belt system.

Figure 8:
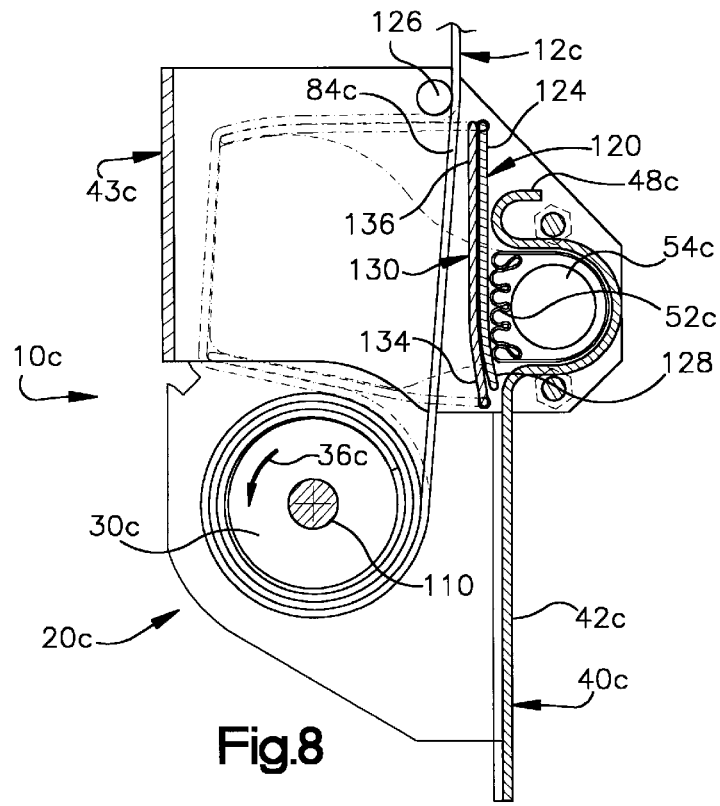
FIG. 8 is a view similar to FIG. 1 of a pretensioner in accordance with a fourth embodiment of the present invention, including parts enabling use of the pretensioner with a force limiter.

FIG. 8 illustrates a pretensioner 10c in accordance with a fourth embodiment of the present invention. The pretensioner 10c is associated with a seat belt webbing retractor 20c. The pretensioner 10c is similar in construction to the pretensioner 10, and parts which are the same or similar are given the same reference numeral with the suffix "c" added.

The pretensioner 10c is configured for use in a seat belt system including a load limiter. The load limiter is a known device, typically provided as a torsion bar (indicated at 110 in FIG. 8) supporting the retractor spool 30c. The load limiter 110 enables the retractor spool 30c, when locked, to rotate in the belt withdrawal direction 36c if a large force is exerted on it. This rotation enables the torso portion of the belt webbing to extend or lengthen by a small amount, upon forceful engagement by the vehicle occupant such as in a vehicle collision.

A pretensioner used with such a load limiter must enable a small amount of belt webbing to be pulled through the pretensioner, when the retractor spool is locked. To provide for such movement, the pretensioner 10c (FIG. 8) includes a pair of movable ebbing engagement flaps 120 and 130 mounted to the retensioner frame 43c. The first flap 120 has a first end portion 124 pivotally mounted near a cross-pin 126 of the pretensioner frame 43c. An opposite second end portion 128 of the first flap 120 is disposed adjacent the mounting portion 42c of the pretensioner base 40c. The first flap 120 lies against the uninflated air bag 52c.

The second flap 130 has a first end portion 134 supported for pivotal movement adjacent the mounting portion 42c of the pretensioner base 40c and adjacent the second end portion 128 of the first flap 120. An opposite second end portion 136 of the second flap 130 is disposed near the cross-pin 126 and adjacent the first end portion 124 of the first flap 120. The second flap 130 extends between the first flap 120 and the portion 84c of seat belt webbing 12c located within the pretensioner frame 43c.

When the pretensioner 10c is actuated, the inflating air bag 52c engages the first flap 120 and pushes it away from the inflator assembly 54c. The first flap 120 pushes the second flap 130, and the first and second flaps pivot in opposite directions into engagement with the belt webbing portion 84c. The belt webbing portion 84c is moved by the flaps 120 and 130 into a non-linear orientation as shown in dashed lines in FIG. 8. This movement draws additional belt webbing 12c into the pretensioner frame 43c, removing slack from the seat belt system, because the retractor spool 30c is blocked from rotation in the belt withdrawal direction 36c.

The belt webbing portion 84c within the pretensioner frame 43c is not positively clamped as in the webbing clamp designs shown in FIGS. 1–7. The belt webbing 12c does, however, extend in a tortuous path around the cross-pin 126, the first flap 120, and the second flap 130. As a result, belt webbing 12c can be pulled from the retractor 20c in a direction to allow a small lengthening of the torso portion of the seat belt system, if enabled by the force limiter 110.

Figures 9, 10:
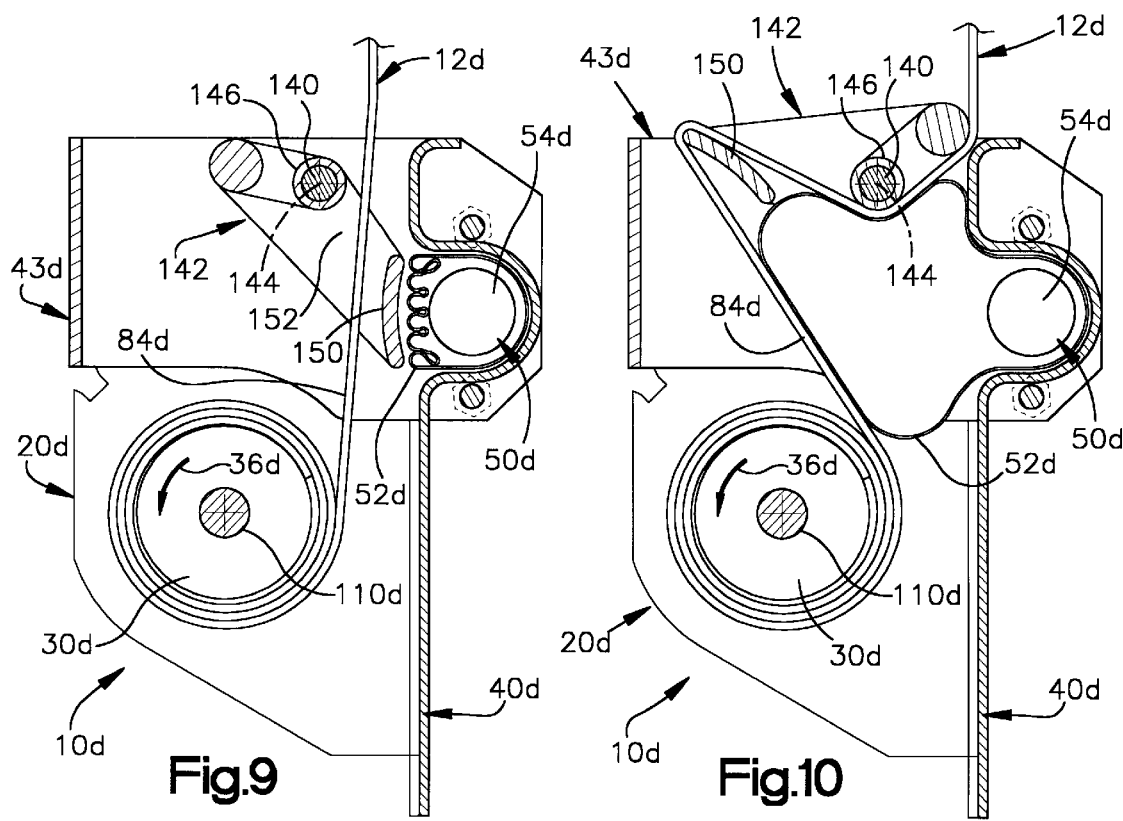
FIG. 9 is a view similar to FIG. 8 of a pretensioner in accordance with a fifth embodiment of the present invention, including parts enabling use of the pretensioner with a force limiter.
FIG. 10 is a view similar to FIG. 9, showing the pretensioner of FIG. 9 in an actuated condition.

FIGS. 9 and 10 illustrate a pretensioner 10d in accordance with a fifth embodiment of the present invention. The pretensioner 10d is associated with a seat belt webbing retractor 20d having a load limiter 110d as in the embodiment illustrated in FIG. 8. The pretensioner 10d is similar in construction to the pretensioner 10c, and parts which are the same or similar are given the same reference numeral with the suffix "d" added.

The pretensioner 10d includes a lever support pin 140 which extends between the side walls of the pretensioner frame 43d. A lever 142 is supported on the lever support pin 140 for pivotal movement relative to the pretensioner frame 43d about an axis 144. A support sleeve 146 of the lever 142 is journalled for rotation on the lever support pin 140.

The lever 142 has an engagement portion 150, movable with the sleeve 146, which is disposed adjacent to the uninflated air bag 52d. The belt webbing 12d extends through an opening 152 in the lever 142 between the engagement portion 150 and the sleeve 146. When the pretensioner 10d is not actuated, the belt webbing 12d is movable freely through the opening 152 in the lever 142, in a generally linear orientation.

When the pretensioner 10d is actuated, the inflating air bag 52d contacts the engagement portion 150 of the lever 142 and pushes the lever from the unactuated position shown in FIG. 9 to the actuated position shown in FIG. 10. This movement moves the belt webbing portion 84d from its linear orientation to a non-linear orientation as shown in FIG. 10. This movement draws additional belt webbing 12d into the pretensioner frame 43d, removing slack from the seat belt system.

The portion 84d of the belt webbing 12d which is within the pretensioner frame 43d is not positively clamped by the pretensioner 10d but does, however, extend in a tortuous path around the lever 142 and the air bag 52d. As a result, belt webbing 12d can be pulled from the retractor 20d in a direction to allow a small lengthening of the torso portion of the seat belt webbing, if enabled by the force limiter 110d.

FIGS. 11–15 illustrate a pretensioner 10e constructed in accordance with a sixth embodiment of the present invention. The pretensioner 10e is associated with a seat belt webbing retractor 20e. The pretensioner 10e is similar in construction to the pretensioner 10, and parts which are the same or similar are given the same reference numeral with the suffix "e" added.

The pretensioner 10e includes a base 40e having a planar mounting portion 42e for mounting the assembly of the retractor 20e and pretensioner 10e to the vehicle. A rectangular central portion 45e of the base 40e defines an air bag assembly chamber 47e which is presented toward the back wall 44e of the pretensioner frame 43e of the retractor 20e. A clamping portion 49e of the base 40e extends from the central portion 45e. The closed side of the clamping portion 49e of the base 40e is presented toward the back wall 44e of the pretensioner frame 43e.

The pretensioner includes an air bag assembly 50e which includes an air bag 52e and an inflator assembly 54e. The air bag assembly 50e is mounted in the air bag assembly chamber 47e and is oriented so that the air bag 52e, when inflated, extends away from the inflator assembly 54e in a direction toward the back wall 44e of the pretensioner frame 43e. The air bag assembly chamber 47e of the pretensioner 10e is substantially larger than the air bag assembly chambers 47—47d described above. As a result, a larger air bag can be accommodated in the pretensioner 10e than in the pretensioners discussed above.

The pretensioner 10e includes a yoke assembly 200. The yoke assembly 200 includes a yoke 210. The yoke 210 (FIG. 15) has two sleeve chambers 212 located at opposite end portions 214 of the yoke. The sleeve chambers 212 are interconnected by an opening 215 in a central portion 216 of the yoke 210. The yoke 210 also has an air bag engagement face 218 on its central portion 216, and a retainer engagement face 220.

The yoke assembly 200 includes a cylindrical guide pin 230 (FIG. 13) having a central portion 232 and opposite end portions 234. The central portion 232 of the guide pin 230 is rigidly fixed in the central portion 216 of the yoke 210. The guide pin 230 is longer than the yoke 210, and the end portions 234 of the guide pin project from the end portions 214 of the yoke.

Two sleeves 240 are disposed in the sleeve chambers 212 in the yoke 210. The sleeves 240 are supported on the guide pin 230 for sliding movement along the guide pin. Two compression springs 242 disposed between the central portion 216 of the yoke 210 and the sleeves 240 bias the sleeves outwardly, toward the end portions 234 of the guide pin 230.

The yoke assembly 200 is supported on the retensioner frame 43e by the guide pin 230. Each one of he frame side walls 46e and 48e has a slot 250. Each one of the slots 250 has a major portion 252 which has a width smaller than the outer diameter of the sleeves 240. The slots 250 have enlarged circular end portions 254, opposite the air bag assembly 50e, which are larger in diameter than the outer diameter of the sleeves 240. The end portions 234 of the guide pin 230 project from the sleeves 240 into the major portions 252 of the slots 250. The sleeves 240 are biased outward by the springs 242 into engagement with the inner side surfaces of the side walls 46e and 48e of the pretensioner frame 43e, as shown in FIG. 13.

A thin sheet metal retainer 260 holds the yoke assembly 200 in an unactuated position against the folded air bag 52e. The retainer 260 extends from a position outside the pretensioner base 40e, around the clamping portion 49e of the base, between the yoke 210 and the belt webbing 12e, around a cross pin 262, and along the mounting portion 42e of the pretensioner base.

When the pretensioner 10e is in the unactuated condition shown in FIGS. 11 and 13, the folded air bag 52e is disposed in the air bag assembly chamber 47e. The seat belt webbing 12e extends between the retractor spool 30e and the cross-pin 262 of the pretensioner frame 43e, at one side of the yoke assembly 200. At the other side of the yoke assembly 200 (the upper side as viewed in FIG. 11), the seat belt webbing 12e extends between the clamping portion 49e of the pretensioner base 40e and a cross-pin 264 of the pretensioner frame 43e. The seat belt webbing 12e lightly engages the retainer 260. The air bag engagement face 218 of the yoke 210 is in engagement with the air bag 52e. The end portions 234 of the guide pin 230 are slidably disposed in the narrow portions 252 of the slots 250, adjacent the air bag assembly 50e.

Upon actuation of the pretensioner 10e, the air bag 52e inflates and moves the retainer 260 and the yoke 210 away from the inflator assembly 54e. The end portions 234 of the guide pin 230 slide freely along the narrow portions 252 of the slots 250, in a direction toward the enlarged end portions 254 of the slots.

As the retainer 260 and the yoke 210 move away from the inflator assembly 54e, they engage the belt webbing 12e and force the belt webbing into a tortuous path extending around the cross pin 264, the metal retainer 260 and the yoke 210. This path is substantially longer than the path of the seat belt webbing 12e when the pretensioner 10e is in the unactuated condition. This change in the orientation of the belt webbing 12e causes additional belt webbing to be drawn into the pretensioner frame 43e, removing slack from the seat belt system.

When the yoke assembly 200 reaches the back wall 44e of the pretensioner frame 43e, the sleeves 240 move outward into the enlarged end portions 254 of the slots 250. Should the vehicle occupant thereafter move forward in the vehicle seat because of rapid vehicle deceleration, the occupant applies a load to the pretensioned seat belt webbing 12e. The belt webbing 12e in turn applies a compressive load to the retainer 260 and to the yoke assembly 200. The yoke assembly 200 is forced back along the slots 250, in a direction toward the inflator assembly 54e. As a result, belt webbing 12e can be pulled from the retractor 30e in a direction to allow a small lengthening of the torso portion of the seat belt webbing.

The movement of the yoke assembly 200 toward the inflator assembly 54e forces the sleeves 240 back into the narrow portions 252 of the slots 250. The sleeves 240 deform the slots 252 as they are forced into the narrow portions 252 of the slots 250. The deformation of the slots 252, and the interference between the sleeves and the edges of the slots 250, resists movement of the yoke assembly 200. This resistance creates an energy-absorbing load on the belt webbing 12e as the torso portion of the belt is pulled out of the pretensioner 10e.

From the above description of the invention, those skilled in the art will perceive improvements, changes and modifications in the invention. Such improvements, changes and modifications within the skill of the art are intended to be covered by the appended claims.

Having described the invention, I claim:

1. An apparatus comprising:
   seat belt webbing for restraining movement of a vehicle occupant; and
   a pretensioner for pretensioning said belt webbing, said pretensioner including a frame, said frame including two side wall portions, a back wall portion and a base portion;
   said belt webbing having a portion extending through said pretensioner;
   said pretensioner including an air bag having a deflated condition and an inflated condition, said air bag when in the inflated condition acting on said portion of said belt webbing to draw webbing into said pretensioner to tension said seat belt webbing and causing said portion of said belt webbing to be blocked from being pulled out of said pretensioner; and
   said pretensioner including an inflation fluid source actuatable to supply inflation fluid to inflate said air bag into the inflated condition, and
   wherein said belt webbing engagement member comprises a lever assembly having a lever support pin extending between said side walls of said pretensioner frame and a lever supported on said lever support pin for pivotal movement relative to said pretensioner frame about an axis, said lever having a support sleeve journalled for rotation on said lever support pin, said lever having an engagement portion disposed adjacent to said uninflated air bag and movable with said sleeve, said belt webbing extending through an opening in said lever between said engagement portion and said sleeve.

2. An apparatus comprising:
   seat belt webbing for restraining movement of a vehicle occupant; and
   a pretensioner for pretensioning said belt webbing;
   said belt webbing having a portion extending through said pretensioner;
   said pretensioner including an air bag having a deflated condition and an inflated condition, said air bag when in the inflated condition acting on said portion of said belt webbing to draw webbing into said pretensioner to tension said seat belt webbing and causing said portion of said belt webbing to be blocked from being pulled out of said pretensioner; and
   said pretensioner including an inflation fluid source actuatable to supply inflation fluid to inflate said air bag into the inflated condition,
   said pretensioner comprising a webbing clamp member movable by inflation of said air bag into a clamping position blocking said portion of said belt webbing from being pulled out of said pretensioner,
   said airbag when moving from the deflated condition to the inflated condition moving said belt webbing against said webbing clamp member to move said webbing clamp member into the clamping condition.

3. An apparatus comprising:
   seat belt webbing for restraining movement of a vehicle occupant; and
   a pretensioner for pretensioning said belt webbing;
   said belt webbing having a portion extending through said pretensioner;
   said pretensioner including an air bag having a deflated condition and an inflated condition, said air bag when in the inflated condition acting on said portion of said belt webbing to draw webbing into said pretensioner to tension said seat belt webbing and causing said portion of said belt webbing to be blocked from being pulled out of said pretensioner; and
   said pretensioner including an inflation fluid source actuatable to supply inflation fluid to inflate said air bag into the inflated condition,
   said pretensioner comprising at least one belt webbing engagement member interposed between said air bag and said portion of said belt webbing for transmitting force from said air bag to said belt webbing to tension said belt webbing,
   said belt webbing engagement member comprising first and second pivotally mounted members which pivot in opposite directions into engagement with said belt webbing upon engagement by said inflating air bag.

4. An apparatus as set forth in claim 3 further comprising a load limiter for enabling said belt webbing when tensioned to extend or lengthen by a small amount upon forceful engagement by the vehicle occupant.

5. An apparatus as set forth in claim 4 wherein said load limiter comprises a torsion bar supporting a seat belt webbing retractor spool.

6. An apparatus as set forth in claim 4 wherein said load limiter comprises a deformable member which deforms upon application to said belt webbing of a load in excess of a predetermined load.

7. An apparatus comprising:
   seat belt webbing for restraining movement of a vehicle occupant; and a pretensioner for pretensioning said belt webbing;

said belt webbing having a portion extending through said pretensioner;

said pretensioner including an air bag having a deflated condition and an inflated condition, said air bag when in the inflated condition acting on said portion of said belt webbing to draw webbing into said pretensioner to tension said seat belt webbing and causing said portion of said belt webbing to be blocked from being pulled out of said pretensioner; and said pretensioner including an inflation fluid source actuatable to supply inflation fluid to inflate said air bag into the inflated condition, said pretensioner comprising at least one belt webbing engagement member interposed between said air bag and said portion of said belt webbing for transmitting force from said air bag to said belt webbing to tension said belt webbing, said belt webbing engagement member comprising a retainer and a yoke, said yoke being engageable by said air bag to move said retainer into engagement with said belt webbing to tension said belt webbing.

8. An apparatus as set forth in claim 7 wherein said yoke moves in a first direction in response to engagement by said air bag, and further comprising means for yieldably resisting movement of said yoke in a second direction opposite said first direction upon forceful engagement of said belt webbing by the vehicle occupant.

9. An apparatus comprising:

seat belt webbing for restraining movement of a vehicle occupant;

an air bag having a deflated condition and an inflated condition tensioning said seat belt webbing;

an inflation fluid source actuatable to supply inflation fluid to inflate said air bag;

a sensor for sensing a vehicle condition for which tensioning of said seat belt webbing is desired and for actuating said inflation fluid source; and at least one belt webbing engagement member interposed between said air bag and said belt webbing for transmitting force from said air bag to said belt webbing to tension said belt webbing, said belt webbing engagement member comprising first and second pivotally mounted members which pivot in opposite directions into engagement with said belt webbing upon engagement by said inflating air bag.

10. An apparatus as set forth in claim 9 wherein said yoke moves in a first direction in response to engagement by said air bag, and further comprising means for yieldably resisting movement of said yoke in a second direction opposite said first direction upon forceful engagement of said belt webbing by the vehicle occupant.

11. An apparatus comprising:

seat belt webbing for restraining movement of a vehicle occupant;

an air bag having a deflated condition and an inflated condition tensioning said seat belt webbing;

an inflation fluid source actuatable to supply inflation fluid to inflate said air bag;

a sensor for sensing a vehicle condition for which tensioning of said seat belt webbing is desired and for actuating said inflation fluid source; and at least one belt webbing engagement member interposed between said air bag and said belt webbing for transmitting force from said air bag to said belt webbing to tension said belt webbing, said belt webbing engagement member comprising a retainer and a yoke, said yoke being engageable by said air bag to move said retainer into engagement with said belt webbing to tension said belt webbing.

* * * * *